Aug. 21, 1934.  J. C. GROFF  1,970,960
MECHANICAL POWER TRANSMITTING DEVICE
Filed Aug. 15, 1933  2 Sheets-Sheet 2
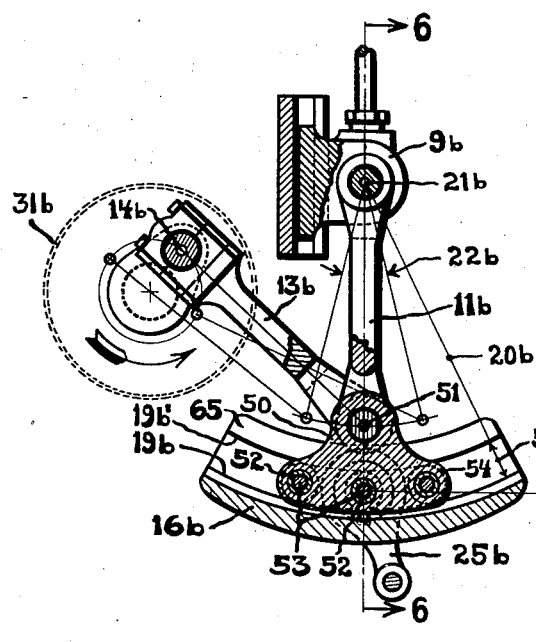
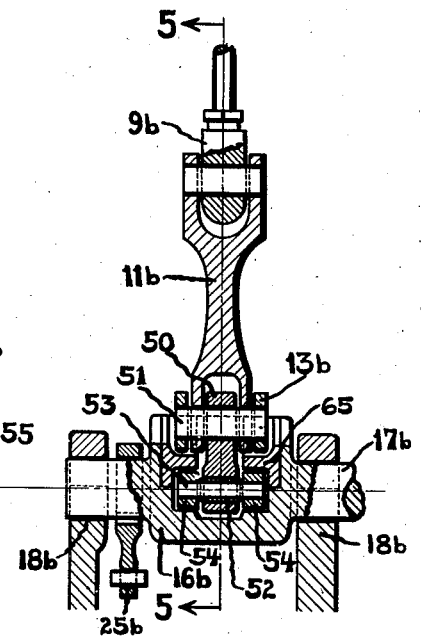
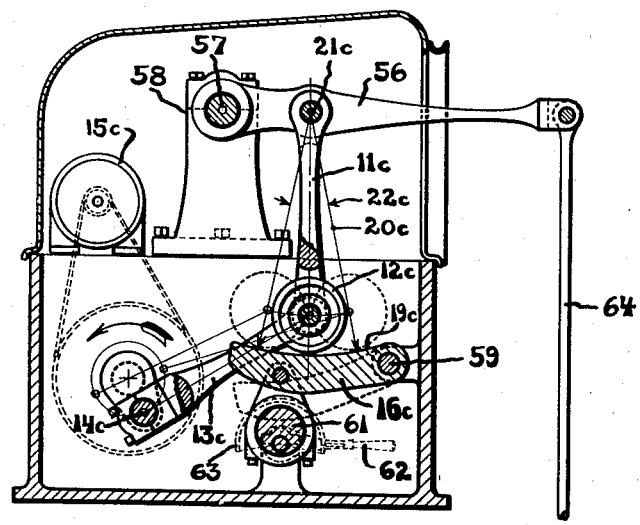
INVENTOR.
Joseph C. Groff
BY
HIS ATTORNEYS.
Cooper, Kerr & Dunham Patented Aug. 21, 1934

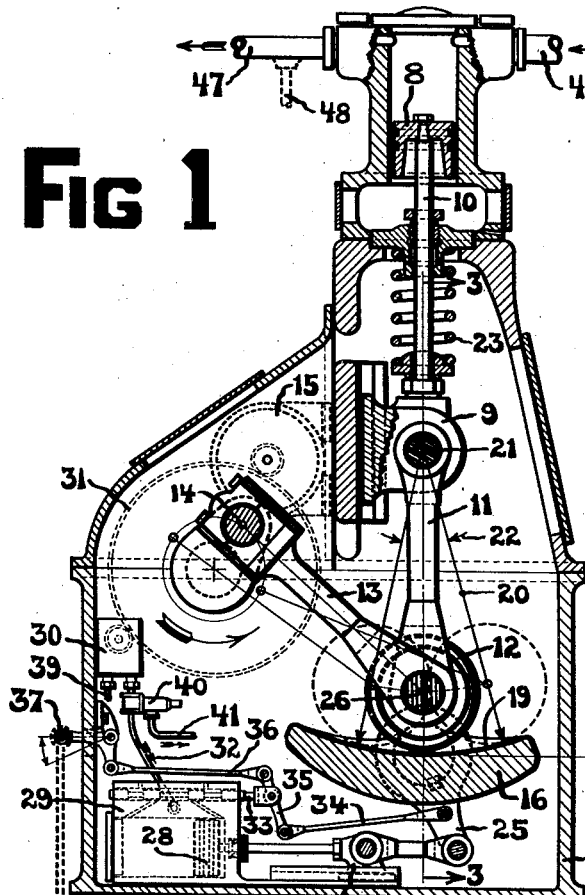

1,970,960

UNITED STATES PATENT OFFICE 1,970,960

MECHANICAL POWER TRANSMITTING DEVICE

Joseph C. Groff, Allentown, Pa.

Application August 15, 1933, Serial No. 685,220

5 Claims. (Cl. 74—44)

The present invention relates to mechanical power transmitting devices though more particularly to mechanisms for receiving drive from a rotating prime mover and transforming it into back-and-forth driving movements to be imparted to reciprocating driven members, such as pumping pistons, forging hammers, machine tool feeds, etc., or to oscillating driven members, such as rocker arms, links, shafts, etc.

The use of increased working pressures of liquids used in the various engineering arts, such as boilers, oil refining stills, hydraulic presses, chemical processes, mechanical atomizing oil burning systems, etc., favors the use of reciprocating piston type pumps due to their positive action and their superior efficiency for high pressure pumping. Many of these and other applications require that the pump be driven by an electric motor and, particularly where alternating current must be used, it is desired that the output (i. e. volume of liquid pumped per unit of time) may be varied over a wide range, from zero output to a determined maximum, without requiring correspondingly wide variation in the speed of the motor.

Also, where synchronous alternating current motors are used, it is desired that the pump may be started from standstill and brought up to synchronous speed without requiring any considerable starting torque.

From the standpoints of simplicity, ease of control, efficiency of power consumption and smoothness (i. e. non-pulsating) of flow of the pump discharge, it is desired that wide variation in output and ease of starting the pump be obtainable from a constant speed driving means without the use of objectionable by-pass valves as heretofore required.

Certain other pumping applications exist wherein the pump must be driven from and by a source of power which operates at various speeds, such as marine engines do under certain circumstances, and where it is desired to be able to maintain the pump output substantially unchanged, despite changes in the speed of the driving means. According to the present invention the output of a reciprocating pump may be adjustably varied, from zero output to a determined maximum, by means of a novel power transmitting and transforming device which affords such desirable variation without requiring change in the speed of the driving means. And, if the speed of the driving means is subject to change the said device affords adjustable compensating variation in the pump output so that said output may be maintained substantially unchanged, or be otherwise adjusted, irrespective of the speed of the driving means.

An important object of the present invention resides in the provision of a power transmitting means whereby, for any given fixed speed of rotation of the prime mover drive, there may be effected adjustable variation in the stroke, or, amplitude of the back-and-forth movement imparted to a driven member, ranging from zero movement to some desired and predetermined maximum amplitude of movement.

A further object of the present invention resides in the provision of a power transmitting means whereby, upon changes in the speed of rotation of the prime mover drive, there may be effected adjustable and compensating variation in the amplitude of back-and-forth movement imparted to a driven member so as to maintain substantially unchanged the lineal velocity imparted to the driven reciprocating member regardless of the speed of rotation of the driving means or prime mover.

A further object of the present invention resides in the provision of a simple mechanical power transmission for operating a reciprocating piston type of pump whereby the volume of fluid pumped may be gradually varied, from zero output to a predetermined maximum output, without requiring any change in the speed of rotation of the driving means and without requiring the use of by-pass valves.

A further object of the present invention resides in the provision of means whereby the aforementioned variations may be accomplished in a substantially gradual (i. e. straight line) manner instead of in a step-by-step manner.

A further object of the present invention resides in the provision of simple, yet positive, means for effecting the aforementioned variations automatically in conjunction with the various known automatic regulating devices, suitable for the particular purpose, such as speed responsive regulators, pressure regulators, temperature regulators, liquid level regulators, liquid flow velocity regulators, etc.

Other and more detailed objects and advantages of the present invention will be hereinafter pointed out in the accompanying specification and claims, and/or shown in the drawings which by way of illustration, show what I now consider to be preferred embodiments of my invention.

In the drawings:

Fig. 1 shows a transverse cross-sectional view of an improved form of power transmitting means as applied to a single acting reciprocating piston type of pump and illustrates diagrammatically the arrangement and relative disposition of certain of the parts for an operating condition when there is to be zero output from the pump even though the driving means continues to operate at its normal speed of rotation. Fig. 1 is taken substantially on line 1—1 in Fig. 3 facing in the direction of the arrows.

Fig. 2 shows a similar view of certain of the parts shown in Fig. 1 and illustrates diagrammatically the working arrangement and relative disposition of the parts for an operating condition when there is to be effected a certain output, or volume of discharge, from the pump. Certain of the parts shown in Fig. 1 have been omitted for the sake of clarifying the illustration in Fig. 2.

Fig. 3 shows a longitudinal cross-sectional detail view of certain of the parts shown in Figs. 1 and 2. Fig. 3 is taken substantially on line 3—3 in Fig. 1 facing in the direction of the arrows. The pump parts shown in Fig. 1 are omitted in Fig. 3.

Fig. 4 is a transverse cross-sectional view, in reduced scale, which illustrates diagrammatically an alternative embodiment of my invention. Parts in Fig. 4 similar to those in Fig. 1 are given like reference numbers but with the suffix $a$.

Fig. 5 is a transverse cross-sectional view which illustrates diagrammatically another alternative embodiment of my invention as adapted for pumping pistons, or other like reciprocating parts of the so-called double acting type and which require that "pulling" as well as "pushing" forces be alternatively applied thereto. Fig. 5 is taken substantially on line 5—5 in Fig. 6 facing in the direction of the arrows. Parts in Figs. 5 and 6 which are similar to those in Fig. 1 are given like reference numbers but with the suffix $b$.

Fig. 6 shows a longitudinal cross-sectional view of the device illustrated in Fig. 5 and is taken substantially on line 6—6 in Fig. 5 facing in the direction of the arrows.

Fig. 7 shows a transverse cross-sectional view which illustrates diagrammatically another alternative embodiment of my invention as adapted for imparting adjustably variable amplitudes of oscillatory movement to a rockerlike arm intended for such purposes as for operating a reciprocating deep-well pump; lifting a drop-forge hammer; effecting intermittent rotational driving effect to a rotating member in combination with such known overrunning clutch means as ratchets, frictional engagements, "free wheeling" rollers, etc., which are not shown in the drawings since such parts are commonly known in the art. Parts in Fig. 7 which are similar to those in Fig. 1 are given like reference numbers but with the suffix $c$.

Referring to Figs. 1, 2 and 3, I will now describe the working arrangement of my novel power transmitting device as illustratively applied to a reciprocating piston type of pump of the single acting type. The pumping piston 8 is preferably driven from a suitable crosshead such as 9 by means of a piston rod 10. Other forms of pistons may be used such as ones which dispense with the crosshead and instead use pistons of trunk type.

One end of a linklike member 11 is pivotally connected to the crosshead and such link 11 carries any suitable bearing means, such as roller 12, at its other end and such link is also pivotally connected to a second linklike member 13 by means of pin 26. Link 13 is connected to, and driven by, a rotating crank 14 which in turn is arranged to be driven by any desired form of prime mover, such as the electric motor 15.

The bearing roller 12 rolls on a novel guiding member 16 which is tiltably mounted on shaft 17 in the bearings 18 (see Fig. 3). It should be understood that said member 16, once it is positioned to have a desired angle of tilt, remains rigidly fixed in that position until otherwise adjusted to have a different angle of tilt by means of lever 25 and controlling apparatus which will be described hereinafter in more detail. That is to say, 16 is essentially a rigidly fixed guiding member but it is adapted to be adjustably positioned so as to occupy any of various angles of tilt ranging from zero to a determined maximum. In most cases, I consider it preferable to limit said maximum angle of tilt to about 65 degrees with respect to reference axis 45 in Fig. 1.

The surface 19 of member 16, on which 12 rollably bears, is of concave circular curvature and in shaped like an arc of a circle having a radius 20. The length of said radius 20 is identically the same as the distance from the center of pivotal connection 21 (between the link 11 and crosshead 9) to the contacting point of roller 12 with surface 19. That is to say, radius 20 is equal to the length of link 11, between its centers 21 and 26, plus the radius of roller 12.

Accordingly, when the guiding member 16 occupies the position having zero angle of tilt, as shown in Fig. 1 (i. e. when its center of curvature coincides with the aforesaid point of pivotal connection 21), rotation of the driving crank 14 merely causes roller 12 and link 11 to oscillate back and forth through arc 22 without imparting any reciprocating movement to crosshead 9. This is the zero or neutral position of the tiltable member 16 for the operating condition in which it is desired that no liquid be discharged by the pump, even though it be desired to start its driving motor 15 or to have the motor continue running without there being any pumping.

Here it should be stated that, upon downward movement of piston 8, the space thus evacuated is filled with liquid coming to the pump cylinder via pipe 46 and the usual automatic intake valves. And, upon upward movement of piston 8 said liquid is discharged under pressure via the usual automatic discharge valves and the outlet pipe 47. When pumping liquids which are heated to any great extent, or, which have a tendency to give off vapors at sub-atmospheric pressures, I consider it desirable that the liquid be supplied to the pump via pipe 46 at a nominal positive pressure of sufficient extent to prevent the pump from becoming vapor bound.

Thus, for example, in the case of pumping heated feed-water into a steam boiler it would be preferable that intake pipe 46 be supplied from an overhead gravity tank or from a low pressure centrifugal pump (not shown in the drawings). Depending upon the particular conditions to be satisfied, said centrifugal pump might be driven directly from the motor 15 or else by a separate motor.

Under such conditions, when the crosshead 9 need not exert pulling forces of any great extent upon piston 8, for the purpose of "sucking" liquid into the pumping chamber via pipe 46, the compressive action of spring 23 together with the force of gravity suffice to always return crosshead 9 and roller 12 downwards and to exert a continued downward pressure engagement of roller 12 against surface 19 of the guiding member 16. (Referring to a vertical single-acting pump as shown in Fig. 1.)

Reciprocating pumping movement may be imparted to crosshead 9 and piston 8, as soon as the guiding member 16 is adjustably tilted with respect to the zero or neutral position it occupies as shown in Fig. 1, and this may be done while crank 14 and the driving motor 15 are rotating at their normal running speed. In Fig. 2, member 16 is illustratively shown in such a tilted position in which 16 and the center of curvature 24 of surface 19 have been tilted through an illustrative arc of 30 degrees. In this position, it will be noted that the pivot center 21 of link 11 and crosshead 9 will be reciprocated with an amplitude of stroke indicated by S. An angle of tilt less than 30 degrees will produce a lesser amplitude of stroke and vice versa.

Accordingly, the volume of liquid pumped per pumping stroke of piston 8 may be adjustably varied as desired, merely by controlling the amplitude of said stroke, and this may be accomplished by adjustably tilting the guiding member 16. Since member 16 serves to variably adjust the amplitude of stroke of piston 8 the said member 16 might well be termed a "stroke transformer".

Adjustable variation of the angle of tilt of stroke transformer 16 may be accomplished either manually or automatically, depending upon the particular conditions to be satisfied, by means of controls acting on lever 25 which is fixed to shaft 17 (see Fig. 3). Here it should be pointed out that, in the case of a multi-cylinder pump, in contradistinction to the single cylinder pump shown in Figs. 1, 2 and 3, there would be a separate crank 14, separate links 11 and 13, a separate roller 12 and a separate stroke transformer 16 for driving each of the respective pumping pistons 8.

Thus, in the case of a three cylinder or triplex pump, there would be three stroke transformers 16 mounted on a common shaft such as 17 and subject to tiltable adjustment by a common lever such as 25 in Fig. 3. And, all of the three members 16 would be in phase (i. e. each and all would concurrently have the same angular position with respect to the horizontal for any given tilt adjustment), whereas the three cranks 14 of such a triplex arrangement would be out of phase with each other by the usual 120 degree angular crank spacing.

Referring to Fig. 1, I will now describe a preferred means for automatically adjusting the angle of tilt of stroke transformer 16. Lever 25 is here shown as connected to a crosshead 27, which is actuated and under the control of double-acting piston 28 working within the bore of the hydraulic cylinder 29. Oil, or other desired hydraulic media, is preferably supplied under suitably high pressure by a positive displacement type of rotary pump 30. Pump 30 is shown as being driven from the same gear wheel 31 which drives crank 14. The oil so supplied to the hydraulic cylinder 29, via pipe 32, serves to exert a multiplied actuating and restraining force on respectively opposite sides of the piston 28 in accordance with the position of the piston valve 33. The position of said valve 33 is controlled by the pivotally interconnected links 34, 35 and 36 and by adjustment of the bellcrank control lever 37.

The controlling force, required to actuate the lever 37, is comparatively negligible because piston valve 33 is of the balanced type and, preferably, effects a lapped fit with cylinder body 29 to thus require no packing for the prevention of leakage and to thus be free of any frictional restriction such as would result if packing were used instead. Controlling movement of lever 37 may be applied either by hand or by automatic controlling devices which are more commonly referred to as "automatic regulators".

An automatic regulator means has been diagrammatically illustrated in Fig. 1 at 66 with an operating member, shown in dashed outline, connected to part 37. As will be readily understood, the particular form of automatic regulating device to be employed, as well as the method of its connection to lever 37, may be widely varied depending upon the use to which the apparatus is to be put. Such automatic regulator means may be in the form of a speed responsive device, a liquid level regulator, a pressure regulator, a liquid flow regulator, or a temperature regulator or the like.

I consider it desirable, particularly for the larger sizes and where high bearing pressures must be employed, to supply the various bearings of my novel power transmission with lubricating oil under a pressure suitable for that purpose. In order to achieve desirable simplification of the apparatus I prefer, in certain instances, to derive the hydraulic pressure controlling medium from the forced feed lubricating oil pump itself rather than from a separate pump.

The means for so doing is shown diagrammatically in Fig. 1 in which the driven oil pump 30 draws its oil supply from any suitable oil sump in the bottom of the bedplate 38 via pipe 39. The oil discharged from pump 30 may pass through pipe 32 to actuate hydraulic piston 28 under control of piston valve 33 and during such times that valve 33 is so positioned by lever 37 to admit oil under pressure to one or the other ends of hydraulic cylinder 29. A spring loaded oil relief valve is preferably located as at 40 and its function is to permit the pump 30 to supply oil under sufficiently high pressure for positively actuating piston 28 and to also supply oil to the bearings via pipe 41 at a pressure somewhat lower than that required for piston 28. Also, during those periods when piston 28 remains in a fixed position no oil is used for its actuation and the entire quantity of oil supplied by pump 30 must be by-passed to the pipe 41 by the relief valve 40.

A preferred arrangement for manually adjusting the degree of tilt of stroke transformer 16, and for locking same in any adjusted position, is illustrated diagrammatically in Fig. 4. The handwheel 42 is rigidly mounted so as to be free from endplay yet free to turn and it provides an internal threaded portion into which screw 43 meshes. The pivotally connected link 44 joins the arm 25a, attached to stroke transformer 16a, to the screw-like member 43 and also prevents it from turning when handwheel 42 is turned. With this arrangement, and because of the permissible snug fits that can be effected between the various parts, the stroke transformer 16a may be rigidly positioned and not be subjected to the oscillatory vibrational movements which would otherwise result from adjusting mechanism involving clearances and back-lash effects.

Referring to Fig. 4, it should be noted that the link-like members 11a and 13a are pivotally interconnected by pin 49 rather than by pin 26a as in Fig. 1. Accordingly, it should be understood that the bearing means 12a may, for certain applications, be connected directly to only one of the link members 11a or 13a and the links may be pivotally interconnected at some desired offset point 49 other than the point of bearing connection 26a.

Certain applications, such as the driving of double-acting pump pistons, or the driving of large size single-acting pump pistons where a considerable suction lift is involved, etc., require that "pulling" forces as well as "pushing" forces be imparted to the piston. For, such applications it would not be entirely feasible to employ a spring, such as compressive spring 23 in Fig. 1, to exert the aforesaid "pulling" forces on the piston 8 or other like parts.

Accordingly, for such applications I prefer to employ the arrangement as illustrated diagrammatically in Figs. 5 and 6. The two link members 11b and 13b may be pivotally interconnected by pin 51 which also may be pivotally connected to a suitable bearing member 50. As shown in Figs. 5 and 6 the bearing member 50 furnishes bearing supports for six bearing rollers 54. More or less than six rollers 54 may be used depending upon the bearing loads to be transmitted.

The cooperating stroke transformer 16b has four curved bearing guiding surfaces of which, the two concave arcuate surfaces 19b effect upward "pushing" forces upon rollers 54 and, two convex arcuate surfaces 19b' effect downward "pulling" forces upon rollers 54 and the cooperating parts 50, 11b and 9b. As shown in Fig. 5, the radius of curvature of the concave surfaces 19b is indicated by radial line 20b whereas the radius of curvature of the convex surfaces 19b' is of a length equal to radius 20b minus the radially measured spacing 55 between the opposedly facing concentrically disposed surfaces 19b and 19b'.

Here it should be mentioned that I prefer the said radial spacing 55 to slightly exceed the diameter of the bearing rollers 54 in order that the parts 54 may rollably tread on either 19b or 19b' without, at the same time, slidably engaging the other surface while respectively imparting "pushing" and "pulling" forces to parts 50, 11b and 9b. In other words, when rollers 54 bear on surface 19b each of said rollers should preferably have a slight radial clearance with respect to surface 19b' and vice versa.

As shown in Fig. 6, the aforesaid radial clearance may be adjusted by means of inserting liners of different radial thickness between member 16b and its two separable curved portions 65. However, in certain instances, I prefer to make 16b in the form of a solid steel casting to include the portions 65 in which case surfaces 19b and 19b' would not be radially adjustable.

When transmitting loads and forces of any considerable magnitude, it becomes desirable to make provision whereby the total load coming upon the part 50 may be equally distributed among the respective bearing rollers 54. Under such conditions, and in addition to accurately machining the surfaces 19b and 19b' and the parts 54 and 50, I prefer to interpose the sleeve 52 between part 50 and each of the bearing pins 53. Said sleeves 52 may be made of semi-elastic material, such as fibre, rubber, lignum vitae or other like known substances. Properly dimensioned, such sleeves will afford sufficient compressible deformation under abnormal load, caused by slight imperfections in machining and/or alignment, to distribute the load more or less equally among pins 53 and rollers 54 bearing on either 19b or 19b".

It should be understood that I do not limit embodiment of my present invention to the actual detailed constructions as herein illustrated and/or described, as it will be apparent to one skilled in the art that the novel features of my invention might be equally well embodied in other constructional arrangements to involve detail modifications best suiting the particular results sought for.

For example, the back-and-forth movement of the driven element may be of oscillatory nature instead of reciprocatinglike and the crosshead 9, shown in Figs. 1, 4 and 5, may be eliminated in favor of using a rocker-arm, such as 56 in Fig. 7, arranged to oscillate about the fulcrum point 57 in bearing 58. With such an arrangement, and if desired, the amplitude of back-and-forth movement of a driven part, such as connecting rod 64 in Fig. 7, may be considerably multiplied with respect to the amplitude of the back-and-forth movement imparted to point 21c by roller 12c and link 11c. The construction shown in Fig. 7 is favored for such purposes as operating a deeply submerged underground pump, operating well drills, etc.

Also, my novel stroke transformer may be mounted and arranged for tiltable adjustment in a manner widely different than the preferred arrangement shown in Figs. 1, 4 and 5. Thus, for example and as shown in Fig. 7, the part 16c may be mounted for tiltable positioning about some offset fulcrum point, such as bearing pin 59, and adjustment of tilt of 16c may be effected by an eccentric, such as 61, and controlled by adjusting lever 62 about the quadrant 63.

And, with regard to the bearing means for contact with the guiding surface of my tiltable stroke transformer it should be understood that other than the preferred roller bearings 12 may be used, such as a curved sliding bearing (not shown in the drawings), to thus effect sliding contact with the curved surface of said stroke transformer instead of preferred rolling contact.

Furthermore, other known forms of driving means than crank 14 may be employed to swing the link 11, and its bearing means 12, back and forth so as to engage my novel tiltable stroke transformer for the purpose described hereinbefore. For example; an eccentric may be used instead of the crank 14; crank 14 may be driven with a rockinglike motion instead of a rotary motion as is preferred; the driven end 14 of the linklike member 13 may be driven with a reciprocating motion instead of by a rotary drive; and, roller bearing 12 may be driven by direct engagement with a rotating camlike member without departing from the broad scope of my invention as claimed hereinafter.

What I claim is:

1. A mechanical power transmitting device for converting rotary motion received from a driving element into a back-and-forth motion which is to be imparted to a driven member, said power transmitting device including provisions for varying the amplitude of back-and-forth motion from zero to a determined maximum, said device comprising a pair of pivotally interconnected links, one driven from the driving element by a cranklike drive and the other connected to the driven element to which a back-and-forth movement of varying extent is to be imparted, bearing means disposed substantially at the point of pivotal interconnection of the links, a tiltably mounted guiding member upon which the bearing means treads, said guiding member having a concave arcuate surface with the proper radius of curvature to provide for zero amplitude of movement of the driven member when the guiding member is tiltably positioned to one position and to impart progressively increased amplitude of motion to the driven member when the guiding member is progressively tilted away from the aforesaid position.

2. A mechanical power transmitting device for converting rotary motion of a driving member into reciprocating motion of a driven member, said mechanical movement comprising devices for varying the amplitude of movement of the driven member from zero to a desired determined maximum, said devices comprising a pair of pivotally interconnected linklike members, a bearing element connected to at least one of said link members and a cooperating tiltably adjustable guiding member to impart movement to the driven member through cooperation with the bearing member upon movement of the latter with respect to the guiding member and shaped so that when in one position no amplitude of reciprocating movement will be imparted to the driven member upon continued rotation of the driving member, said adjustable guiding member on being progressively tilted providing for the imparting of progressively increased amplitude of stroke to the driven member.

3. A stroke transformer adapted for control by an automatic regulator and adapted for rotary drive at a continuous maintained speed from a rotary driving means and for actuating a driven element with a back-and-forth motion of changeable amplitude ranging from zero to a determined maximum, said stroke transformer including a guiding member tiltably adjustable under the control of the automatic regulator, a pair of pivotally interconnected links, one receiving its drive through a cranklike connection from the rotary driving means, the other being pivotally interconnected to the driven member, a bearing element connected to at least one of said links and cooperating with the surface of the guiding member, said guiding member having a bearing guiding surface portion thereof shaped as an arc of such radius as to provide zero amplitude of movement to the driven member when the guiding member is positioned in one position and to provide progressively increased amplitude of motion to the driven member as the guiding member is tilted away from the aforesaid position under the control of the automatic regulator.

4. A device for driving a pumping piston or the like from a rotary driving member and for varying the amplitude of back-and-forth piston motion from zero to a determined maximum with the rotary driving member in maintained motion at unchanged speed, said device comprising a pair of pivotally interconnected links, one pivotally connected to piston operating means and the other connected through a crank-like drive to the rotary driving member and stroke transforming means to provide the required variable amplitude of piston stroke, said last mentioned means comprising a tiltable guiding member and co-acting bearing means connected to at least one of the aforesaid links, said guiding member having a curved surface with a radius of concave curvature equal to the distance between said surface and the point of pivotal connection of the link to the piston operating means for the purpose described.

5. A stroke transformer adapted for control by an automatic regulator and adapted for rotary drive at progressively changeable speeds of rotation from a rotary driving means and for actuating a driven element with a back-and-forth motion of changeable amplitude ranging from zero to a determined maximum, said stroke transformer including a guiding member tiltably adjustable under the control of the automatic regulator, a pair of pivotally interconnected link-like members, one receiving its drive through a crank-like connection from the rotary driving means, the other being pivotally interconnected to the driven element, a bearing member connected to at least one of said links and cooperating with the surface of the guiding member, said guiding member having a bearing guiding surface portion thereof shaped as an arc of such radius as to provide zero amplitude of movement to the driven element when the guiding member is positioned in one position and to provide progressively increased amplitude of back-and-forth movement to the driven element as the guiding member is tilted away from the aforesaid position under the control of the automatic regulator whereby said amplitude may be compensatingly increased upon progressive reductions in the speed of the rotary driving means and vice versa for the purpose of automatically maintaining the lineal velocity of said back-and-forth movement substantially unchanged irrespective of changes in the speed of the rotary driving means.

JOSEPH C. GROFF.